United States Patent [19]

Rivoallan et al.

[11] 4,199,221
[45] Apr. 22, 1980

[54] ELECTRO-OPTIC THIN-FILM WAVEGUIDE MODULATOR DEVICE

[76] Inventors: Loic A. Rivoallan, Tossen Hat, Kermoroc'H, France, 22140; Francois P. Favre, Residence du Levant, Perros-Guirec, France, 22700

[21] Appl. No.: 858,553

[22] Filed: Dec. 8, 1977

[30] Foreign Application Priority Data

Dec. 15, 1976 [FR] France ................. 76 38437

[51] Int. Cl.² ............................................. G02B 5/14
[52] U.S. Cl. ............................................. 350/96.14
[58] Field of Search .................... 350/96.12, 96.14

[56] References Cited

U.S. PATENT DOCUMENTS

| | | | |
|---|---|---|---|
| 3,795,433 | 3/1974 | Channin | 350/96.14 |
| 3,877,781 | 4/1975 | Kaminow | 350/96.14 |
| 4,000,937 | 1/1977 | Kaminow | 350/96.14 |
| 4,070,094 | 1/1978 | Martin | 350/96.14 |

OTHER PUBLICATIONS

Tsai et al., *Applied Physics Letters*, vol. 27, No. 4, Aug. 1975, "Ultrafast guided light beam...".

*Primary Examiner*—Stewart J. Levy
*Attorney, Agent, or Firm*—Laff, Whitesel & Rockman

[57] ABSTRACT

An electro-optical light wave modulator is a waveguide constituted by a thin electro-optic material layer on which conductive clads are deposited and supported by a substrate. The refractive index of the thin layer is larger than that of air and that of the substrate material, so that vertical guiding is inherently ensured.

The conductive clads form a divergent arrangement which opens towards a light input. At the device inlet, the distance between the conductive clads is large enough for guiding one or several light wave modes. At the device outlet, the corresponding distance is too small for guiding any mode when no difference of voltage is applied to the clads. When the voltage difference between the two clads reaches a certain value, the resulting electric field enable the device outlet to guide one or several modes, depending on such a voltage value. By varying the voltage difference, it is possible to modulate light which is outgoing from the device outlet.

3 Claims, 3 Drawing Figures

ELECTRO-OPTIC THIN-FILM WAVEGUIDE MODULATOR DEVICE

The present invention relates to an electro-optical device to be utilized for modulating light waves, guided in thin film.

It is known that electro-optical, thin-film devices may have important applications in light wave transmission systems for use in the field of broadband telecommunication systems. Advantages which are provided by electro-optical thin-film devices are, for instance, clearly described in the technical article entitled "Light Waves in Thin Films and Integrated Optics" by P. K. Tien and published in the American review "APPLIED OPTICS", November 1971, Vol. 10, No. 11, pages 2395–2415. In particular, the author emphasizes the interest of developing electro-optical thin-film devices that can simultaneously guide and modulate light waves.

Light wave guiding through a thin film or a thin layer must be considered along two directions, one being normal to the film or layer plane and the other being in the film or layer plane, but perpendicular to the general light wave transmission direction. As far as the direction normal to the film plane is concerned, light wave guiding results from the fact that the refractive index of the thin film material is larger, on the one hand, than that of the air space above the free film surface and, on the other hand, that of the substrate under the thin film. In such a film, light wave propagation is performed, as electromagnetic wave propagation through waveguides, in discrete modes that are characterized by their effective propagation indexes $\beta/k$. In the hereabove mentioned article, FIG. 23, page 2408, shows how the number of modes existing in a film depends on the thickness thereof and how effective propagation indexes for those modes vary with that thickness. In a substantially thick film, the effective propagation index becomes substantially equal to the refractive index of the film material. Under specific thickness values, the first propagation of highest ranked modes, and then lower ranked modes, becomes impossible in the film or layer. Between those extreme values of thicknesses, the effective propagation indexes vary linearly over an important range. It is recalled that the effective propagation index is related to the propagation speed v by the relation $b = c(k/\beta)$, wherein c is the speed of light waves in vacuum and $\beta$ is the propagation phase constant.

As far as the transverse direction which is perpendicular to the general light propagation direction is concerned, light wave guiding may be obtained by physically side limiting the thin film or layer. The refractive index of the guiding layer material must be larger than that of material at borders of the guiding layer. Propagation modes are also to be considered in connection with the width of the guiding layer. Transverse modes are still characterized by effective propagation indexes that also vary with the width of the guiding layer, in a manner similar to that that is illustrated in FIG. 23 of the above mentioned article. When the guiding layer is an electro-optic material, the refractive index of such a material varies with the electric field applied to the layer material. The induced index variation results in propagation speed change. That property has made it possible to design electro-optical thin-film devices which are capable of modulating transmitted light waves by providing two parallel thin layers, light waves to be transmitted being divided at an input of those two layers. The two layers are not submitted to the same electric field so that by suitably combining output light waves from the two layers, an amplitude modulation may be obtained. Such electro-optical thin film devices are particularly described in the following technical articles:

(a) "Electro-optic intensity modulation in LiTaO₃ ridge waveguide," by Juichi Noda et al, in the American review "Applied Physics Letters", Vol. 26, No. 6, Mar. 15, 1975, pages 298–300;

(b) "Electro-optic light modulator with branched ridge waveguide," by Yoshiro Ohmachi and Juichi Noda, in the American review "Applied Physics Letters", Vol. 27, No. 10, Nov. 15, 1975, pages 544–546;

(c) "Efficient strip-waveguide modulator," by I. P. Kaminow et al, in the American review "Applied Physics Letters", Vol. 27, No. 10, Nov. 15, 1975, pages 555–557.

Those electro-optic modulators use two parallel light paths and have drawbacks resulting from difficulties in manufacturing two identical films or layers and due to the number of operations which are to be performed.

Electro-optic light deflection or diffraction modulators are also known, as for instance those described in the technical article entitled "Fast electro-optic waveguide deflector modulator" by J. M. Hammer et al in the American review "Applied Physics Letters", Vol. 23, No. 4 of Aug. 15, 1973, pages 176–177, and in the technical article entitled "Light beam scanning and deflection in epitaxial LiNbO₃ electro-optic waveguides" by P. K. Tien et al in the American review "Applied Physics Letters", Vol. 25, No. 10 of Nov. 15, 1974, pages 563–565. However those modulators cannot actually make VHF modulations due to their inherent capacitances.

Furthermore, it is known to define, in a thin layer, the limits of a light waveguide having a predetermined width by depositing parallel metal strips onto the thin layer. The characteristic modes of propagation in such a waveguide are particularly described in the technical article "Propagation Characteristics of a Partially Metal-Clad Optical Guide: Metal-Clad Optical Strip Line" by Y. Yamamoto et al in the American review "Applied Optics", Vol. 14, No. 2 of February, 1975, pages 322–326. However as indicated in the technical article entitled "Metal-Clad Optical Waveguides: Analytical and Experimental Study" by I. P. Kaminow et al in the American review "Applied Optics", Vol. 13, No 2, February 1974, pages 396–404, index changes from the part of the thin layer that is not under the metal clads to the parts of the thin layer that are under the metal clads are generally as little as $10^{-4}$. As a result the minimum waveguide widths must be rather large, for instance of 10 $\mu$m. Above these minimum widths lateral guiding may only be made with prohibitive losses.

Particularly from the technical article entitled "Optical intensity modulator with three-dimensional waveguide" by Shingo Uehara et al in the American review "Applied Physics Letters", Vol. 26, No. 6, of Mar. 15, 1975, pages 296–300, it is also known that when a voltage is applied between the metal clads defining the optic waveguide, the refractive index changes in the part which is not covered by the electrodes when the thin layer material is an electro-optic material, that is a change in the waveguide. Depending on the direction of the so applied electric field with respect to the crystal axes of the thin layer, there is either an increase or a reduction of the waveguide refractive index. The guiding effect resulting from the metal-clads applied on the thin layer may thus be at least partially improved or destroyed. However in such a parallel metal-clad waveguide, a rather large waveguide width must be provided to make it possible to couple light to the waveguide without too much loss. As a result, the extinction ratio is low, i.e. less than 10%. In addition, ligh wave modulation in a wide waveguide, by an electro-optic effect, results in utilizing a rather high modulation voltage.

A purpose of the present invention is to provide an electro-optical device for modulating light waves as they are guided in a thin film or layer comprising a thin layer made of electro-optic material on which metal clads are deposited. This avoids the drawbacks met with the above-mentioned known devices, particularly in providing a rather wide inlet for improving input light coupling while producing a considerably improved extinction ratio or even a perfect extinction ratio.

Another purpose of the present invention is to provide an electro-optical thin-film modulator wherein the waveguide is produced by metal clads deposited on a thin film, the manufacture of which is substantially easier than those of above-mentioned parallel path modulators or switched path modulators.

According to a feature of the present invention, there is an electro-optical device for modulating light waves guided in a thin layer made of electro-optic material, the refractive index of which is larger than that of the substrate supporting the thin layer. The substrate is thick enough for guiding one or several light wave modes. Conductive clads are deposited on the thin layer and are connected to a source of controllable voltage. The conductive clads are arranged in side-by-side relationship with respect to each other to define a light waveguide. The conductive clads are convergent to each other from the inlet of the waveguide to the outlet thereof.

According to another feature of this invention, when no voltage is applied to the conductive clads there is no electric field between them. The distance between the convergent conductive clads at the device inlet is wide enough for transversally guiding one or several light wave modes while the distance between the convergent conductive clads at the device outlet is not wide enough for such a guiding.

According to another feature of this invention, above a predetermined value of voltage applied to the conductive clads, transversal light wave guiding is provided at the device outlet for one or several light wave modes.

The above mentioned purposes and features of the present invention, as well as other purposes and features, will appear more clearly from the following description of an embodiment the description being made in conjunction with the accompanying drawings, wherein.

Figure 1:
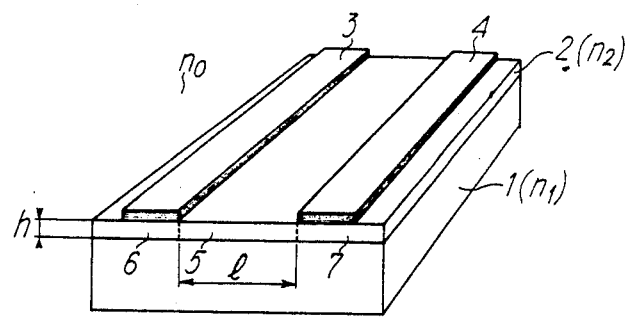
FIG. 1 is a schematic perspective view of a known electro-optical device for modulating light waves through a thin layer.

In FIG. 1, as in the electro-optical modulator described in the last mentioned technical article, the electro-optical device comprises a substrate 1 made of electro-optic material (such as $LiTaO_3$) on which a thin film 2 is deposited to serve as a guide for light waves. Thin layer 2 may be produced by diffusing a metal into the substrate. Refractive index $n_2$ of thin layer 2 is both larger than the refractive index $n_0$ of air above thin layer 2 and refractive index $n_1$ of substrate 1. On thin layer 2, two parallel aluminum clads 3 and 4 have been deposited for instance in using photolithographic techniques. Aluminum clads 3 and 4 are aimed at producing, in thin layer 2, between them a region 5 wherein the refractive index is larger than that of adjacent regions 6 and 7.

Figure 2:
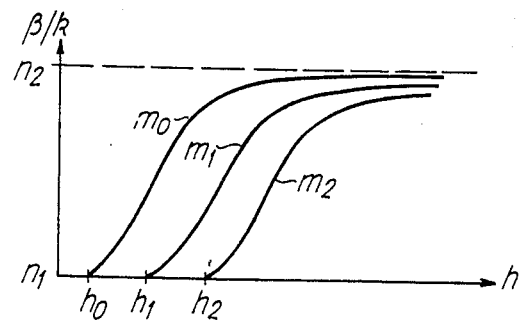
FIG. 2 is a conventional diagram showing how effective indexes of several modes vary versus thickness or width of a light waveguide in a thin layer.

As it is known, according to mode effective index curves shown in FIG. 2 that are similar to those shown in FIG. 23 of the first mentioned technical article, the number of modes existing in thin layer 2 depends on the thickness h thereof and that also determines the effective propagation index for each mode. It is to be noted that under a minimum thickness $h_0$ no mode is guided. Above thickness $h_0$ the effective index of mode $m_0$ increases from $n_1$ to $n_2$ first linearly, then asymptotically. Above thickness $h_1$, mode $m_1$ can be transmitted, and so on.

With respect to the width l of region 5, it would be also possible to plot mode effective indexes versus width, with results, which are similar to those shown in FIG. 2. It is to be noted that the difference of refractive indexes between region 5 and both regions 6 and 7 is much smaller than the difference of refractive indexes between region 5 and air, on the one hand, and substrate 1, on the other hand. As a result widths $w_0$, $w_1$, etc., for which a guiding of the modes $m_0$, $m_1$, etc., becomes possible are relatively large compared to thicknesses $h_0$, $h_1$, etc. The device shown in FIG. 1 may be designed with a distance of 15–20 μm between metal clads 3 and 4, such a distance defining the width of region 5. That width is already relatively small for obtaining an efficient coupling of light waves entering the waveguide.

Furthermore it is known that refractive index of region 5 may be varied by applying an electric field having a suitable orientation with respect to crystal axes of thin layer 2. Particulary this may reduce the difference of refractive indexes between region 5, on the one hand, and regions 6 and 7, on the other hand. When such a refractive index difference is small enough lateral guiding is no more possible. Indeed mode effective indexes vary versus that refractive index difference in a similar manner as illustrated by curves shown in FIG. 2. However as the distance between clads 3 and 4 is relatively large a rather high voltage difference must be provided between those clads 3 and 4 for producing an electric field which is high enough for destroying light wave guiding. In practice light wave guiding is not completely destroyed. Thus the extinction ratio is low, about 10%.

Figure 3:
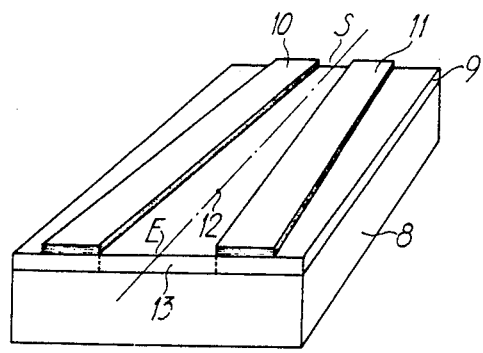
FIG. 3 is a schematic perspective view of an electro-optical device according to this invention.

In the device according to this invention, shown in FIG. 3, there is provided a substrate 8 made of electro-optic material such as lithium niobate, on which a thin guiding layer 9 is produced by oxidizing and diffusing (at about 960° C.) a thin titanium layer through the polished surface of substrate 8. The titanium layer 9 may be about 250 angstroms thick. To be noted, the method of producing such a layer 9 is known for instance from the description given in the technical article entitled "Metal-diffused optical waveguides in $LiNbO_3$" by R. V., Schmidt and I. P. Kaminow in the American review "Applied Physics Letters", Vol. 25, No. 8 of Oct. 15, 1974, pages 458–460. The polished surface of substrate 8 is normal to the crystallographic axis "Y" of substrate crystal. A layer of aluminum is then deposited on the thin layer 9. Then by use of photograving methods conductive metal clads 10 and 11 are produced. Clads 10 and 11 are not parallel to each other, but are arranged to form a predetermined angle with respect to each other. By way of example, the sizes of the device shown in FIG. 3 may be as follows: clads 10 and 11 are 6 mm long. The ends of the clads at the device inlet E are separated by a distance of 30 μm, while the ends of the clads at device outlet S are separated by a distance of 6 μm. Clads 10 and 11 are symmetrically arranged with respect to an axis 12 indicating the general direction of light propagation.

Clads 10 and 11 produce, in the thin layer 9, a region 13 operating as a light waveguide that is shaped as a corner provided with an open apex. At inlet E, the width of region 13 is large enough for guiding several light wave modes; while the opposite width of 6 μm the outlet S of region 13 is too narrow to provide some guiding of the light when there is no voltage difference between clads 10 and 11. Such an operation results from the selected distance from clad 10 and clad 11 at outlet S taking into account the refractive difference index between region 12 and other parts of layer 9 which is caused by the conductivity of clads 10 and 11.

On the opposite, by applying a voltage difference between clads 10 and 11, an electric field is produced in region 13 that has a gradient increasing from inlet E to outlet S. When that voltage difference is high enough, the resulting refractive index increase can confine, within region 13, light wave energy that propagates without loss along the corner structure and emerges from outlet S. With a reciprocal voltage difference, such a confinement is fully destroyed before it reaches outlet S of the device.

The device shown in FIG. 3, sized as above-mentioned has been tested in the following manner. Neon Helium laser light waves with a wavelength of 0.63 μm are applied to inlet E of the waveguide by using a prism coupling. Light waves are delivered from waveguide outlet S through another prism, in a conventional manner. A modulation ratio which is close to 100% has been obtained, with a peak-to-peak control voltage of about 20 volts between clad 10 and 11, the control voltage frequency varying from 0 Hz to 1 GHz. Optical losses through the modulator were found to be lower than 5 dB. That last good result may be credited to the large width of device inlet E that simplifies the light wave injection and reduces consequent losses.

It is to be noted that the device shown in FIG. 3 may be manufactured in a very simple manner by utilizing well known techniques.

The voltage difference applied to clads 10 and 11 is obtained by connecting those clads 10 and 11, respectively, to the two terminals of a controllable voltage source (not shown). When varying the voltage delivered from that controllable voltage source, for instance, from 0 to the voltages which guide the desired modes, it is possible to modulate the light waves which are outgoing from the waveguide outlet.

While the principles of the present invention have been hereabove described in relation to a specific embodiment, it must be clearly understood that the description has only been made by way of example and not as a limitation to the scope of this invention.

What we claim is:

1. An electro-optical device comprising means for modulating light waves guided in a thin layer made of an electro-optical material, the refractive index of said thin layer being larger than the refractive index of a substrate supporting said thin layer, said thin layer being thick enough for guiding one or several light wave modes, conductive metal clad means deposited on said thin layer, a controllable voltage source means connected to said clad means, said conductive clads being arranged in a side-by-side relationship with respect to each other in order to define between them a light waveguide, said conductive clads being geometrically convergent from inlet to outlet and extending from a relatively wide waveguide inlet to a relatively narrow waveguide outlet, wherein the distance between said convergent conductive clads at said waveguide inlet is wide enough for transversally guiding one or several light wave modes while the distance between said convergent conductive clads at said waveguide outlet is too narrow for such a guiding when no voltage difference is applied to said conductive clads, respectively.

2. An electro-optical device comprising means for modulating light waves guided in a thin layer made of an electro-optical material, the refractive index of said thin layer being larger than the refractive index of a substrate supporting said thin layer, said thin layer being thick enough for guiding one or several light wave modes, conductive metal clad means deposited on said thin layer, a controllable voltage source means connected to said clad means, said conductive clads being arranged in a side-by-side relationship with respect to each other in order to define between them a light waveguide, said conductive clads being geometrically convergent from inlet to outlet and extending from a relatively wide waveguide inlet to a relatively narrow waveguide outlet, wherein the distance between convergent conductive clads at waveguide outlet is large enough for transversally guiding one or several light wave modes when a predetermined voltage difference is applied to said conductive clads.

3. An electro-optical device as set forth in claim 2, wherein said voltage source means provides and applies to said conductive clads a voltage which is modulated from 0 to at least said predetermined voltage difference to modulate light waves delivered from waveguide outlet.

* * * * *